United States Patent [19]

Ogden et al.

[11] 4,038,244
[45] July 26, 1977

[54] FLUOROCARBON POLYMER
[75] Inventors: Keith Ogden, Thornton-Cleveleys; John Quinby, Northwich, both of England
[73] Assignee: Imperial Chemical Industries Limited, London, England
[21] Appl. No.: 446,505
[22] Filed: Feb. 27, 1974
[30] Foreign Application Priority Data
  Mar. 5, 1973   United Kingdom ............... 48-10537
[51] Int. Cl.² .............................................. C08K 9/04
[52] U.S. Cl. ............................. 260/42.16; 260/29.6 F; 260/42.14; 260/42.15; 260/42.27; 260/42.55
[58] Field of Search ............... 260/42.27, 42.14, 42.16, 260/29.6 F

[56] References Cited
U.S. PATENT DOCUMENTS
3,880,798   4/1975   Deem et al. ...................... 260/42.27

Primary Examiner—James H. Derrington
Attorney, Agent, or Firm—Cushman, Darby & Cushman

[57] ABSTRACT

Filled coagulated dispersion fluorocarbon polymers are made by coagulating the filler and the polymer together after treating the filler with a tetrafluoroethylene oligomer derivative.

7 Claims, No Drawings

FLUOROCARBON POLYMER

This invention relates to fluorocarbon polymers containing fillers and to a method of making such filled polymers.

By fluorocarbon polymers there are included polytetrafluoroethylene (PTFE) and copolymers of tetrafluoroethylene with up to 15% by weight of other monomers such as ethylene, vinyl chloride and hexafluoropropene made by the dispersion method.

Fluorocarbon polymers of this kind can be made by methods well known in the art. The polymerisation can be carried out in an aqueous medium in the presence of a catalyst and a dispersing agent to provide a dispersion of colloidal size polymer particles in the aqueous medium. For certain purposes, the polymer is recovered from the dispersion by means of coagulating the polymer particles and is then said to be in coagulated dispersion form.

It is desirable for many reasons to be able to incorporate a filler in a fluorocarbon polymer. In the case of coagulated dispersion grades of fluorocarbon polymers, it is not possible due to the cohesive nature of the polymers to incorporate the fillers by means of mechanical mixing. It has accordingly been proposed in the case of PTFE to disperse the filler in the PTFE dispersion and then coagulate the filler and the PTFE together. It is however important that the filler should be evenly dispersed in the polymer and this has proved a difficulty in the past.

Belgian patent No. 740,629 of Farbwerke Hoechst AG describes a method for the manufacture of polytetrafluoroethylene and fillers by suspension of the filler in an aqueous polytetrafluoroethylene dispersion followed by coagulation of the polytetrafluoroethylene and the filler wherein a cationic substance containing a hydrocarbon residue of 12 to 30 carbon atoms is added to the dispersion before coagulation.

It has now been found that if the coagulation is carried out in the presence of a fluorocarbon derivative capable of making the filler hydrophobic it is possible to effect a very even dispersion of filler in the fluorocarbon polymer by coagulating the fluorocarbon polymer and filler from an aqueous medium.

According to one aspect, therefore, the invention provides a method of producing a filled coagulated dispersion form of fluorocarbon polymer comprising treating the filler with a fluorocarbon derivative which acts as a hydrophobising agent for the filler and coagulating the polymer together with the treated filler from an aqueous dispersion. Preferably the filler is treated with a solution of the fluorocarbon derivative to make it hydrophobic before it is added to an aqueous dispersion of the polymer. When it has been made hydrophobic, suitably by being contacted by the solution and subsequently dried, the filler may be added to the aqueous dispersion of the polymer and the polymer and filler then coagulated together.

The invention further provides a filled coagulated dispersion fluorocarbon polymer made by the above methods and also a filled coagulated dispersion fluorocarbon polymer comprising in intimate admixture particles of the fluorocarbon polymer and particles of filler, the filler particles being coated with fluorocarbon derivative as subsequently defined.

The fluorocarbon derivative should be capable of forming a stable layer on the filler particles to the extent at least that it renders them hydrophobic and ensures that the hydrophobic property remains effective in the presence of an aqueous medium for a sufficient length of time for the coagulation with the polymer to take place. The fluorocarbon derivative may contain a group or groups, e.g. a hydrophobilic group, having an affinity for the filler particles, or it may contain a group or groups enabling molecules of the derivative associate or combine together to form a layer on the filler particle surface. Both mechanisms may play a part. While we do not wish to be bound by theory, we believe that a group having an affinity for the filler particles, e.g. hydrophilic group, attaches itself to the surface of the filler particle leaving the fluorocarbon group directed outwards thus making the filler particles hydrophobic. The filler particle is then able to coagulate with the PTFE particles when these begin to coagulate from the aqueous medium.

The invention may be applied to the manufacture of filled grades of PTFE using a wide variety of fillers for example metallic fillers such as aluminum, bronze, copper, nickel and iron; mineral fillers such as asbestos, mica, silica and talc; and glass. There is generally no need to pretreat fillers which are already hydrophobic e.g. graphite, to assist in their coagulation with the fluorocarbon polymer from the aqueous dispersion because this can take place using the natural hydrophobicity of the filler.

It should be noted that when the fluorocarbon derivative contains a hydrophilic group, it is not necessary that the derivative as a whole should be hydrophilic.

In the manufacture of filled coagulated dispersion grades of fluorocarbon polymers, the pretreated filler may be added to an aqueous dispersion of the polymer and the dispersion agitated to cause coagulation of the filler and the polymer.

The pretreatment of the filler for use with the fluorocarbon polymer dispersion may be conducted by dissolving the fluorocarbon derivative in an organic solvent, placing the filler in the solution and agitating the filler in the solution as the system is evaporated dryness. The solvent can on a small scale be allowed to evaporate to atmosphere but on a larger scale it should be condensed and recovered for further use.

Fluorocarbon derivatives above referred may have the general formula

where R is a fluorocarbon group which is either saturated or unsaturated and which provides at least a terminal fluorocarbon group of at least 3 carbon atoms; Z is a group enabling the derivative to form a hydrophobic layer on the filler e.g. a group having an affinity for the filler particles especially a hydrophilic group, or a silane or siloxane group, and B is a bridging group between R and Z which allows each of R and Z to exert its required function, namely that R should exhibit hydrophobising properties and Z should enable the molecules of the derivative to form a layer on the filler.

Suitably, fluorocarbon derivatives of the formula R—B—Z may be used wherein R is as above defined and B is a bridging group between R and Z and either
 i. Z is anionic, amphoteric or non-ionic; or
 ii. Z is anionic, cationic, amphoteric or non-ionic and either B contains at least one atom other than carbon, hydrogen and halogen, or R is further characterised in that it contains a group derived by the elimination of an F atom from an oligomer of tetrafluoroethylene (TFE) or hexafluoropropene (HFP) and is a branched, internally unsaturated group.

B may include e.g. a phenylene, alkylene, an amido or an ester group.

Preferred perfluorocarbon derivatives contain the grouping

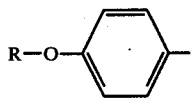

wherein the phenylene group (which forms part of the B group in the above general formula) is joined directly or indirectly to Z.

The group R may be a perfluoroisopropyl or a perfluoro-tertiary-butyl group. More generally it is a group containing a terminal fluoroalkyl or fluoroalkylene chain of at least three carbon atoms, preferably a perfluoroalkyl or perfluoroalkylene chain. Such a terminal chain may be provided, for example, by a straight fluoroalkyl group or by a branched fluoroalkenyl or fluoroalkyl group of which the following are preferred examples:

$(CF_3)_2CF(CF_2)_n-$ $C_2F_5-C(CF_3) = C(C_2F_5)CF_2-$ $(C_2F_5)_2-C(CF_3)-C(CF_3) = C(CF_3)-$ $C_2F_5-C(CF_3) = C(CF_3)-CF_2-CF_2-$ $(C_2F_5)_2-C(CF_3)-CH_2-$ $(C_2F_5)_2-C(CF_3)-CH = C(CF_3)-$

Fluoroalkyl and fluoroalkenyl groups may be linked directly to the group Z provided they contain sufficient groups to supply a terminal moiety of 3 carbon atoms and a bridging group between the terminal moiety and Z.

Alkali metal, ammonium and alkyl ammonium salts of perfluoro- carboxylic, -phosphoric and -sulphonic acids (anionic surfactants) or polyoxyalkylene compounds having branched or straight perfluoro terminal groups (nonionic surfactants) are amongst the material suitable for this invention. Hydrophilic groups are also provided by xanthate salts and esters, polyamide chains and polyimine chaines. Whilst we prefer to use the anionic and non-ionic fluorochemical surfactants described above, surfactants containing either a straight or a branched perfluorocarbon group and a cationic group, for example a quaternary nitrogen group and optionally a neutralising anion either joined covalently to the molecule (amphoterics) or merely in ion-pair association cationics) may be used; of these, we prefer the amphoteric surfactants. Examples of conveniently prepared compounds include the following types of anionic and non-ionic surfactants:

$R_fSO_3^-M^+$ $R_f(CH_2)_mCOO^-M^+$ $R_fOC_6H_4SO_3H$ $R_fO(CH_2CH_2O)_xR^1$ $R_fOC_6H_4CH_2O(CH_2CH_2O)_xR^1$ $R_fOC_6H_4CH_2O(CH_2CH_2O)_xR_f$ $R_fOC_6H_4CH_2PO_3^-M_2^+$ $R_fOC_6H_4SO_2O(CH_2CH_2O)_xSO_2C_6H_4OR_f$ in which $R^1$ is hydrogen or a short alkyl group and $R_f$ is $C_nF_{2n+1}$ or $C_nF_{2n-1}$ where n is 6, 8, 10 or 12, for example n-$C_8F_{17}$ or the branched groups $C_{12}F_{23}$, $C_{10}F_{19}$, $C_8F_{15}$ and $C_6F_{13}$ derived from TFE oligomers, x is an integer from 1 to 40, m is an integer from 1 to 6, $M^+$ is hydrogen, alkali metal, ammonium or alkyl or alkylol substituted ammonium including quaternary ammonium.

Other preferred compounds are:

$R_f^1OC_6H_4COOM^+$ $R_f^1OC_6H_4SO_2N-(CH_2)_mSO_3^-M^+$
                |
                $R^2$ $R_f^1OC_6H_4CON-(CH_2)_mSO_3M^+$
                |
                $R^2$ $R_f^1OC_6H_4CH_2PO_3^-M_2^+$
$R_f^1O(C_5H_4N^+)R^2A^-$
$R_fOC_6H_4SO_2N(CH_2CH_2O)_mPO_3M_2^+$
                |
                $R^2$ $R_f^1OC_6H_4CON(CH_2CH_2O)_mPO_3M^+$
                |
                $R^2$ $(R_f^1O)_2C_6H_3SO_3^-M^+$ wherein
$R_f^1$ is a perfluoroalkenyl group of formula $C_8F_{15}$, $C_{10}F_{19}$, $C_{12}F_{23}$
$R^2$ is an alkyl group of up to five carbon atoms
$A^-$ is selected from $Cl^-$, $Br^-$, $I^-$ and $CH_3SO_4^-$ and
M and m are as above defined
and $R_f^2CH_2CONH(CH_2)_mSO_3M^+$
$R_f^2CH_2CH_2OPO_3M_2$ wherein
$R_f^2$ is branched perfluoroalkyl group, preferably $C_6F_{13}$, and
M is as above defined.

Examples of cationic surface-active agents include the following:

$R_fSO_2N(R)(CH_2)_mN^+R_3^1A^-$ $R_fOC_6H_4CH_2N^+R_3A^-$ $R_fC_6H_4SO_2N(R^1)(CH_2)_mN^+R_3^1A^-$ where $R_f$, $R^1$, m and $A^-$ are as previously defined.

It is preferred to derive the perfluorocarbon groups from TFE or hexafluoropropene oligomers, because these oligomers represent a relatively inexpensive source of branched fluorocarbon chains; thus we prefer to use compounds containing the branched perfluoroalkenyl groups $C_8F_{15}$, $C_{10}F_{23}$ which are derived respectively from the tetramer, pentamer and hexamer of TFE by the abstraction of a fluorine atom. Compounds containing the $C_6F_{13}$ group may be made by degradation of the pentamer. Another group conveniently derived from the $C_{10}F_{20}$ oligomer is the group $C_9HF_{16}$ and compounds containing this group are also suitable for use in this invention: these are not included in the above definition of perfluorocarbon derivatives.

The methods of preparation of many of the surfaceactive agents described or listed above, containing branched perfluorocarbon groups, have been described in our U.K. Patent Specifications Nos. 1,143,599; 1,130,822; 1,143,927; 1,148,486; 1,176,492; 1,176,493; 1,151,601; 1,155,607; 1,182,645; 1,206,596; 1,270,661; 1,270,662 and 1,270,838. Suitable TFE oligomer derivatives containing a hydrophilic group may be selected from or prepared from compounds described in the complete specifications of our copending U.K. patent applications 8295/71, 5495/72, 5496/72, and 19786/72 and German published specifications P 2 215 385.1 and P 2 321 443.9.

Where R in the formula R-B-Z is straight chain $C_nF_{2n+1}$, suitable compounds may be made as described in our U.K. patent specification No. 1,270,838. Examples of the compounds which may be made by the process in the latter specification include:

$$R_f^3C_6H_4SO_3^-M^+$$

$$R_f^3C_6H_4SO_2NH(CH_2)_mN^+R_3^1A^-$$

$$R_f^3C_6H_4SO_2O(CH_2CH_2O)_xR^1$$

$$R_f^3C_6H_4SO_2NH(CH_2)_mNR_2CH_2CH_2CH_2COO^-$$

where M, $A^-$ $a$, $m$ and $R^1$ are as previously defined and $R_f^3$ is straight chain perfluoroalkyl or 3 or more carbon atoms. The disclosures of our foregoing patent specifications are herein incorporated by reference.

It will be observed that in the majority of the perfluorocarbon derivatives a hydrocarbon or other group is present between the perfluorocarbon group and the hydrophilic group. It is clearly desirable that the hydrocarbon or other group should not exert so large an influence upon the properties of the molecule that the effects of the perfluorocarbon chain are lost. Therefore, we prefer that the number of carbon atoms in any hydrocarbon chain intervening between the perfluorocarbon group and the hydrophilic centre should not be greater than the total number of carbon atoms in the perfluorocarbon group. For this purpose a benzene ring counts as a chain of four carbon atoms in the hydrocarbon portion, and carbon atoms in branches of an aliphatic chain or substituents on an aromatic ring do not count as chain carbon atoms.

Especially preferred hydrophobising agents for use in this invention are anionic surface active agents of the formula $$R_f\!-\!O\!-\!\!\!\left\langle\!\!\bigcirc\!\!\right\rangle\!\!-\!XK$$

wherein $R_f$ is a perfluorocarbon group derived from a TFE oligmer, X is an anionic group and K is a cationic group. Examples of $-XK$ are $-SO_3M$
$-CO_2M$
$-SO_2N-CH_2-CH_2-SO_3M$
$\quad\ \ |$
$\quad\ R^2$
$-SO_2N-CH_2-CH_2-CO_2M$
$\quad\ \ |$
$\quad\ R^2$
$-SO_2N-CH_2-CH_2-O-P(O)(OM)_2$
$\quad\ \ |$
$\quad\ R^2$ where $R^2$ is an alkyl group, preferably having 1-5 carbon atoms, especially methyl, or is hydrogen, and M is as previously defined especially H, Na, K, ammonium and substituted ammonium.

Preferred hydrophobising agents of the last mentioned general formula are represented as follows:

$$C_nF_{2n-1}OC_6H_4SO_2N(CH_2)_mK$$
$$\qquad\qquad\qquad\ \ |$$
$$\qquad\qquad\qquad R^3$$

wherein
$n$ is 8, 10 or 12
$R^3$ is an alkyl group containing from one to five carbon atoms or is hydrogen
$m$ is an integer from one to six
K is—$SO_3M$, $COOM^1$ or $OPP_3M^1{}_2$ wherein
$M^1$ is hydrogen, alkali metal, ammonium or alkyl substituted ammonium.

The group $R^3$ is preferably a methyl or ethyl group and $m$ is preferably a small integer less than four; especially preferred are the range of compounds wherein $m$ is equal to 2.

The perfluoroalkenyl group $C_nF_{2n-1}$ may be a straight-chain group but is preferably a branched group derived from an oligomer of tetrafluoroethylene $C_nF_{2n}$.

The $C_6H_4$ group is a disubstituted phenylene group wherein the two substituents may be ortho, meta or para but are preferably in the para postitions on the phenylene ring.

The compounds may be made conveniently from the sulphonic acid or sulphonyl chloride derivative of the phenyl ether derivative of a perfluoro-olefine.

$$C_nF_{2n-1}OC_6H_5$$

Such derivatives have been disclosed in our U.K. Patent Specifications 1,130,822 and 1,270,662.

A preferred method of preparation is by means of a reaction between $$C_nF_{2n-1}OC_6H_4SO_2Cl$$

and a compound of formula $$R^3NH(CH_2)_mK$$

wherein $R^3$, $m$ and K are as hereinbefore defined.

The preferred method of preparation of the compounds in which K is $OPO_3M_2$ is by the action of a phosphorus oxyhalide (for example phosphorus oxychloride) or phosphorous pentoxide on an alcohol having the structure $$C_nF_{2n-1}OC_6H_4SO_2N(R^3)(CH_2)_mOH$$

wherein $n$, $m$ and $R^3$ are as above defined.

Examples of cationic surfactants are:

$$R_f\!-\!O\!-\!\!\left\langle\!\!\bigcirc\!\!\right\rangle\!\!-\!\overset{+}{N}CH_3CH_3SO_4^-$$

$$R_f\!-\!O\!-\!\!\left\langle\!\!\bigcirc\!\!\right\rangle\!\!-\!SO_2\!-\!N\!-\!CH_2\!-\!CH_2\!-\!\overset{+}{N}(CH_3)_2R^3Y^-$$
$$\qquad\qquad\qquad\qquad\ \ |$$
$$\qquad\qquad\qquad\ \ CH_3$$

where
$R^3$ = alkyl
$Y$ = I or Br

In the foregoing, preferred values of $R_f$ are $C_8F_{15}$ and $C_{10}F_{19}$, the surfactants being TFE tetramer and pentamer derivatives in these cases.

Suitable non-ionic surfactants include compounds of the formula:

$$R_f^5O(CH_2CH_2O)_n-R^4$$

$$R_f^5O(CH_2CH_2O)_n-R_f^5$$

where $R_f^5$ is an internally unsaturated branched $C_8F_{15}$ or $C_{10}F_{19}$ group;

$n$ is an integer from 6 to 40 and $R^4$ is alkyl or alkylol

Examples are $C_{10}F_{19}O(CH_2CH_2O)_{23}C_{10}F_{19}$ and $C_{10}F_{19}O(CH_2CH_2O)_8CH_3$.

Straight chain perfluorocarbon derivatives that may be used are $$n\text{-}C_7F_{15}CO_2M$$
$$n\text{-}C_8F_{17}SO_3M$$
$$n\text{-}C_8F_{17}SO_2NCH_2CH_2OP(O)(OM)_2$$
$$\quad\quad\quad\quad |$$
$$\quad\quad\quad\quad R^5$$
$$[n\text{-}C_8F_{17}SO_2NCH_2CH_2O]_2P(O)OM$$
$$\quad\quad\quad\quad |$$
$$\quad\quad\quad\quad R^5$$

where

M is as previously defined, especially H, Na, K, $NH_4^+$ or $NH_xR_y^{2+}$ where $R^2$, $x$ and $y$ are as previously defined.

$R^5 = CH_3$ or $C_2H_5$.

Further oligomer derivatives include compounds and esters of compounds having the formula:

$$R_f^6-B^1-CH_2CH_2OH$$

wherein $R_f^6$ is a perfluoroalkenyl group having from 5 to 20 carbon atoms and $B^1$ is selected from the group consisting of $$-OC_6H_3(Q)CON(Q^1)-$$

$$-OC_6H_3(Q)SO_2N(Q^1)-$$

$$-OC_2CH(Q^1)O-$$

wherein

Q is H, $CH_3$ or $OR_f^6$ and $Q^1$ is H, $CH_3$, $C_2H_5$ or $CH_2CH_2OH$.

Further derivatives include compounds and esters of the formula $$(C_2F_5)_2(CF_3)C-B^2-CH_2OH$$

wherein $B^2$ is selected from $-CH_2-$ and $-CON(Q')CH_1-$ wherein $Q'$ is defined above.

Other fluorocarbon derivatives that may be used in this invention are silanes and siloxanes comprising at least one group of the general formula $$R-B-Z'$$

where R is a fluorocarbon group which is either saturated or unsaturated and which provides at least a terminal fluorocarbon group, preferably a perfluorocarbon group of at least 3 carbon atoms; Z' is a group of formula $$SiR'_rX_sO_{\frac{3-r-s}{2}}$$

where R' is a monovalent hydrocarbon group, X is a hydrolisable group, $r$ is 0, 1 or 2, $s$ is 0, 1, 2 or 3 and $r + s$ is not greater than 3.

Silanes and siloxanes as disclosed in the complete specification of our copending U.K. application No. 11052/72 (German published specification No. 2,311,879.8) may be used in this invention and the disclosure of the said specifications is herein incorporated by reference.

Preferably in the above general formula B is represented as $$G_pC_qH_{2q}$$

where G is a divalent group, $p$ is 0 or 1 and $q$ is 2, 3 or 4.

The siloxanes that may be used may contain in addition to the above specified groups one or more units of the general formulae $Y_3SiO_{1/2}$, $Y_2SiO$, $YSiO_{3/2}$, $SiO_2$, $YHSiO$, $HSiO_{3/2}$ and $HY_2SiO_{1/2}$ where Y is a monovalent hydrocarbon group or substituted hydrocarbon group of the kind known in siloxanyl units.

The group G may be oxygen, an alkylene group having not more than 8 carbon atoms, a polyoxyalkylenediol residue, or a phenoxy or phenoxy-containing group bonded to the fluorocarbon group through the oxygen atom. By phenoxy-containing groups we include phenoxy groups of which the benzene nulceus is substituted e.g. with an alkyl, alkoxy or halogen group and phenoxy groups linked to the $C_qH_{2q}$ group through another group, e.g. COO or $SO_2NH$ whether or not the benzene nucleus of the phenoxy group is substituted.

The groups R' may be alkyl, aryl, alkaryl, aralkyl, or cycloalkyl groups, for example, methyl, ethyl, propyl or phenyl groups.

It is in general preferred that the groups R' be methyl groups.

The group X may be, for example, a halogen, an alkoxy group, a substituted alkoxy group (e.g. an alkoxyalkoxy or aminoalkoxy group), an aroxy or a polyoxyalkylene group. Suitable groups include, for example, fluorine, chlorine, bromine, methoxy, ethoxy, propoxy, butoxy, methoxyethoxy, ethoxyethoxy, phenoxy and 2-(N,N-dimethylamino) ethoxy groups. It is normally preferred that the groups X can be chlorine, methoxy or ethoxy groups.

The group R is preferably $C_nF_{2n-1}$ where $n = 8$, 10 or 12.

Preferred compounds for use may be represented as

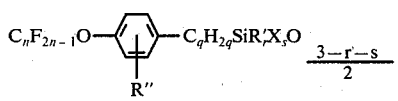

where $R'' = $ H, alkyl, alkoxy or halogen e.g. $C_{10}F_{19}OC_6H_4(CH_2)_3Si(OCH_3)_3$ $C_nF_{2n-1}OC_6H_4COOC_qH_{2q}SiR'_rX_sO_{\frac{3-r-s}{2}}$ $C_nF_{2n-1}OC_6H_4SO_2NHC_qH_{2q}SiR'_rX_sO_{\frac{3-r-s}{2}}$ e.g. $C_{10}F_{19}OC_6H_4SO_2NH(CH_2)_3Si(OC_2H_5)_3$ This invention is further illustrated by reference to the following Examples.

EXAMPLE 1

A bronze filled coagulated dispersion grade of PTFE was made by the following procedure.

8.10 kg of bronze powder of approximately 43 microns number average mean particle size was treated with a 1% solution of a TFE oligomer derivative of the formula

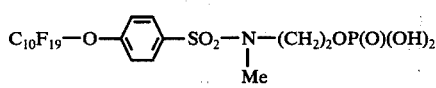

which may be made in accordance with Example 4 of the complete specification of our said copending U.K. application No. 19786/72 (German specification P 2 321 443.9). 1.26 liters of a 1% solution of this compound in 1,1,2-trifluoro 1,2,2-trichloroethane is used in the bronze is slurried with the solution in a glass vessel and the solvent evaporated off. When the bronze is dry it is added to 5 gallons of demineralised water in a stirred vessel. 29.5 kgs of an 18.3% by weight solids dispersion of PTFE in an aqueous medium are then added and the stirrer speed is increased. The gel stage is reached in about 2 minutes and complete separation of the bronze and the PTFE from the aqueous medium is achieved at about 4 minutes. The bronze was found to be well dispersed in the polymer. The batch was recovered and dried and was found to be satisfactory for moulding and extrusion purposes.

EXAMPLE 2

In this example a bronze powder was first treated with a solution of a TFE oligomer derivative of the formula $C_{10}F_{19}OC_6H_4COOH$. For this purpose, 1 g of the TFE oligomer derivative was dissolved in 100 ccs of a 90:10 w/w isopropyl alcohol/water mixture. 10ccs of this solution was added to 100 g of bronze powder having a approximate number average mean particle size of 43 microns. The bronze was stirred with the solution which was sufficient to dampen the bronze and then the bronze was oven dried on a tray at 90° C for 30 minutes. As a result of this the bronze was not discoloured and was found to be hydrophobic on being tested in water. The amount of TFE oligomer derivative used was sufficient to give 0.1% w/w on bronze.

The treated bronze was then coagulated with PTFE as follows.

432 g of an 18.5% w/w PTFE dispersion was diluted with 900 g of water in a vessel fitted with a stirrer. The stirrer was started and 120 g of the treated bronze was added. Stirring was continued for 12 minutes at ambient temperature. At the end of this time, the bronze was found to have coagulated with the PTFE and to be floating on the surface of the liquid in the vessel as a coagulum with the polymer in which it was well dispersed. The filled polymer was recovered and after drying was found to be suitable for moulding and extrusion.

EXAMPLE 3

The procedure of Example 2 was repeated using a TFE oligomer derivative of the formula $C_{10}F_{19}OC_6H_4SO_3H$.

The percentage of oligomer derivative on bronze was however half that used in Example 2. For this purpose, a solution of the oligomer derivative in a similar isopropyl alcohol/water mixture was made but the solution was added to the bronze at a rate of 5 ccs rather than 10 ccs per 100 g of bronze. Following coagulation, a filled PTFE polymer having dispersed bronze was produced which was suitable for moulding and extrusion.

EXAMPLE 4

The procedure of Example 3 was repeated but using instead a TFE oligomer derivative of the formula $C_{10}F_{19}OC_6H_3(COOH)_2$.

Good bronze dispersion in polymer was achieved and the product was suitable for moulding and extrusion.

EXAMPLE 5

This illustrates the preparation of a glass filled coagulated dispersion form of PTFE. 7.5 ml of a 10% w/w solution of the TFE oligomer derivative used in Example 1 in 1,1,2-trifluoro-1,2,2-trichloroethane was diluted with 35 ml of this solvent and added to 300 g of finely divided glass which was tumble dried until the solvent had evaporated. 400 g of an 18% by weight solids dispersion of PTFE in an aqueous medium was diluted with water to give a 9% by weight solids dispersion. 20 g of the treated glass was added to the dispersion which was stirred for 6 minutes. A coagulum of polymer and glass was formed, the glass being evenly dispersed in the polymer.

We claim:

1. A method of producing a filled coagulated dispersion form of a fluorocarbon polymer which method comprises
   a. treating a filler with a hydrophobising agent which is an anionic surface active agent of the formula:-

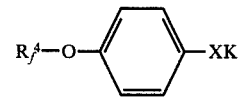

where $R_f$ is a perfluorocarbon group derived from a TFE oligomer, X is a an anionic group and K is a cationic group,
   b. adding the treated filler to an aqueous dispersion of the fluorocarbon polymer, and
   c. coagulating the polymer and filler together.

2. A method according to claim 1 in which XK represents $-SO_3M$
$-CO_2M$
$-SO_2N-CH_2-CH_2-SO_3M$
　　|
　　$R^2$
$-SO_2N-CH_2-CH_2-CO_2M$
　　|
　　$R^2$
or
$-SO_2-N-CH_2-CH_2-O-P(O)(OM)_2$
　　　　|
　　　　$R^2$ where $R^2$ is hydrogen or an alkyl group with 1 to 5 carbon atoms and M is H, alkali metal or ammonium.

3. A method according to claim 2 in which $R_f^A$ in the formula of the hydrophobising agent represents a group of the formula $C_nF_{2n-1}$ where $n = 8$ or 10 or 12.

4. A method of producing a filled coagulated dispersion form of a fluorocarbon polymer which method comprises:

An aniones treating the filler with a hydrophobising agent of the formula

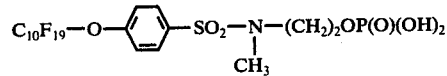

b. adding the treated filler to an aqueous dispersion of the fluorocarbon polymer, and c. coagulating the polymer and filler together.

5. A method acording to claim 1 wherein the filler is selected from aluminum, bronze, copper, nickel, iron, asbestos, mica, silica, talc and glass.

6. A filled coagulated dispersion form of a fluorocarbon polymer comprising in intimate admixture particles of the fluorocarbon polymer and particles of filler, the filler particles being coated with an anionic fluorocarbon derivative of the formula:

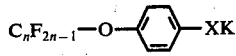

wherein XK is selected from

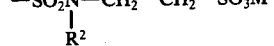
or
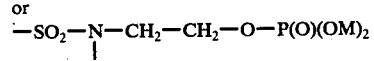

where $R^2$ is hydrogen or an alkyl group with 1 to 5 carbon atoms and M is H, alkali metal or ammonium, and $n$ is 8, 10 or 12.

7. A filled polymer according to claim 6 wherein the filler is bronze or glass.

* * * * *